(12) United States Patent
Tang

(10) Patent No.: US 7,574,199 B2
(45) Date of Patent: Aug. 11, 2009

(54) MOBILE STATION AND METHOD FOR DETECTING ATTACKS IN A POWER SAVE MODE FOR THE SAME

(75) Inventor: Cheng-Wen Tang, Shenzhen (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 325 days.

(21) Appl. No.: 11/309,668

(22) Filed: Sep. 8, 2006

(65) Prior Publication Data

US 2007/0086369 A1    Apr. 19, 2007

(30) Foreign Application Priority Data

Oct. 14, 2005    (TW)    .................. 94135985

(51) Int. Cl.
*H04M 1/66* (2006.01)
*H04M 1/00* (2006.01)

(52) U.S. Cl. .................. 455/410; 455/411; 455/423

(58) Field of Classification Search .................. 455/410, 455/411, 414.1, 423, 435.1, 343.1, 574, 422.1; 713/168; 380/247, 249
See application file for complete search history.

(56) References Cited

U.S. PATENT DOCUMENTS

| | | | | |
|---|---|---|---|---|
| 6,374,355 B1* | 4/2002 | Patel | .................. | 713/168 |
| 6,510,515 B1* | 1/2003 | Raith | .................. | 713/163 |
| 6,665,530 B1* | 12/2003 | Broyles et al. | .............. | 455/411 |
| 7,342,906 B1* | 3/2008 | Calhoun | .................. | 370/338 |
| 2004/0165551 A1 | 8/2004 | Krishnamurthi et al. | | |
| 2005/0136833 A1 | 6/2005 | Emeott et al. | | |
| 2005/0251680 A1* | 11/2005 | Brown et al. | .................. | 713/171 |
| 2007/0197190 A1* | 8/2007 | Tang | .................. | 455/410 |
| 2007/0217360 A1* | 9/2007 | Tang | .................. | 370/329 |

FOREIGN PATENT DOCUMENTS

| | | |
|---|---|---|
| KR | 20030018266 | 3/2003 |
| KR | 20040041195 | 5/2004 |
| KR | 20040042397 | 5/2004 |

* cited by examiner

*Primary Examiner*—Sonny Trinh
(74) *Attorney, Agent, or Firm*—Wei Te Chung

(57) ABSTRACT

A method for detecting attacks in a power save mode includes providing a mobile station and an access point; entering a power save mode by the mobile station; producing a dummy mobile station by the mobile station, and initiating the dummy mobile station to communicate with the access point; producing mock data and transmitting the mock data from the dummy mobile station to the mobile station via the access point; and determining whether the mock data is saved in the access point to detect whether there is an attack. A mobile station employing the method is also provided.

18 Claims, 18 Drawing Sheets

MOBILE STATION AND METHOD FOR DETECTING ATTACKS IN A POWER SAVE MODE FOR THE SAME

FIELD OF THE INVENTION

The invention relates to wireless communications, and particularly to a mobile station and a method for detecting attacks during a power save mode of the mobile station.

DESCRIPTION OF RELATED ART

For mobile stations, such as mobile phones, notebook computers, personal digital assistants (PDAs), etc., electricity resources are limited and valuable. Many mobile stations have power save modes, in order to save electricity and keep the mobile stations active and idle for a longer time after a charge. The mobile stations consume much less electricity in a power save mode than in a normal mode, so electricity is effectively saved.

When a mobile station is in a power save mode, and other mobile stations transmit data to the mobile station via an access point, the data sent to the mobile station are saved in a buffer of the access point. In such case, an attacker (also known as a 'sniffer') can deceive the access point by using a media access control (MAC) address of the mobile station, and obtain the data before the data is sent to the mobile station. Consequently, the mobile station cannot receive the data. That is, the mobile station in a power saved mode may suffer from a sniffer attack, losing access to the inbound data.

SUMMARY OF THE INVENTION

An exemplary embodiment of the present invention provides a mobile station that detects sniffer attacks when in a power save mode. The mobile station includes a dummy module, a dummy mobile station, and a determining module. The dummy module produces the dummy mobile station. The dummy mobile station includes a producing module for producing mock data. The determining module determines whether the mock data is saved in the access point to detect whether there is an attack.

Another exemplary embodiment of the present invention provides a method for detecting attacks in a power save mode. The method includes providing a mobile station and an access point; entering a power save mode by the mobile station; producing a dummy mobile station by the mobile station, and initiating the dummy mobile station to communicate with the access point; producing mock data and transmitting the mock data from the dummy mobile station to the mobile station via the access point; and determining whether the mock data is saved in the access point to detect whether there is an attack.

Other advantages and novel features will become more apparent from the following detailed description when taken in conjunction with the accompanying drawings, in which:

DETAILED DESCRIPTION OF THE INVENTION

Figure 1:
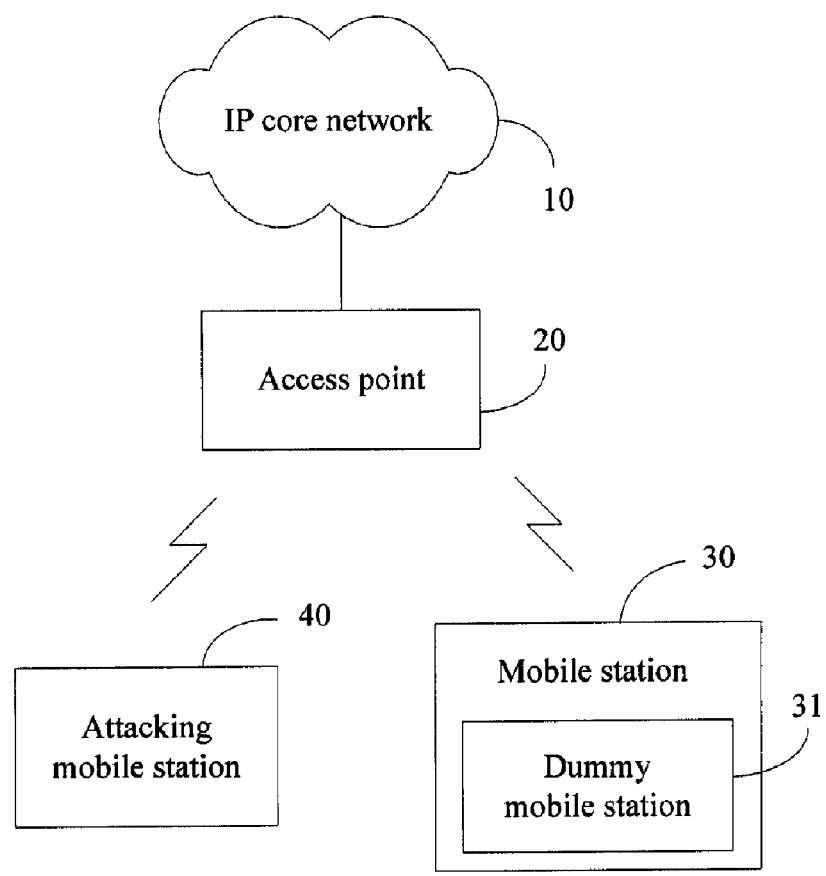
FIG. 1 is a schematic diagram of a wireless communication system of a first exemplary embodiment of the present invention.

FIG. 1 is a schematic diagram of a wireless communication system of a first exemplary embodiment of the present invention. In the exemplary embodiment, the wireless communication system includes an Internet protocol (IP) core network 10, an access point 20, a mobile station 30, and an attacking mobile station 40. The mobile station 30 includes a dummy mobile station 31 produced by the mobile station 30.

The access point 20 is connected to the IP core network 10 in a wired connection. The mobile station 30 and the attacking mobile station 40, may be devices such as notebook computers, mobile telephones, or personal digital assistants (PDAs), etc., that can be connected to a wireless local area network. That is, the mobile station 30 and the attacking mobile station 40 wirelessly communicate with the access point 20.

Because the mobile station 30 and the access point 20 communicate wirelessly via a frame, the attacking mobile station 40 can receive the frame as well, and obtain a media access control (MAC) address of the mobile station 30 from the frame. When the mobile station 30 enters a power save mode due to its inactive use, and other mobile stations (not shown) in the wireless communication system transmit data to the mobile station 30 via the access point 20, the data before being transmitted to the mobile station 30 are saved in a buffer of the access point 20. In such case, the attacking mobile station 40 can deceive the access point 20 by using the MAC address of the mobile station 30, and obtain the data meant for the mobile station 30.

In this embodiment, a method for detecting a sniffer attack provided. In the exemplary embodiment, when entering a power save mode, the mobile station 30 produces the dummy mobile station 31, and initiates the dummy mobile station 31 to communicate with the access point 20. Then the dummy mobile station 31 produces mock data and transmits the mock data to the mobile station 30 via the access point 20. Then the mobile station 30 determines whether the mock data is saved in the access point 20 to detect whether there is an attack. If the mock data is saved in the access point 20, the mobile station 20 determines that there is no attack. In such case, the mobile station 30 can enter the power save mode. If the mock data is not saved in the access point 20, the mobile station 20 determines there is an attack. Accordingly, the mobile station 30 exits the power save mode to avoid a further attack and prevent further data loss.

Figure 2:
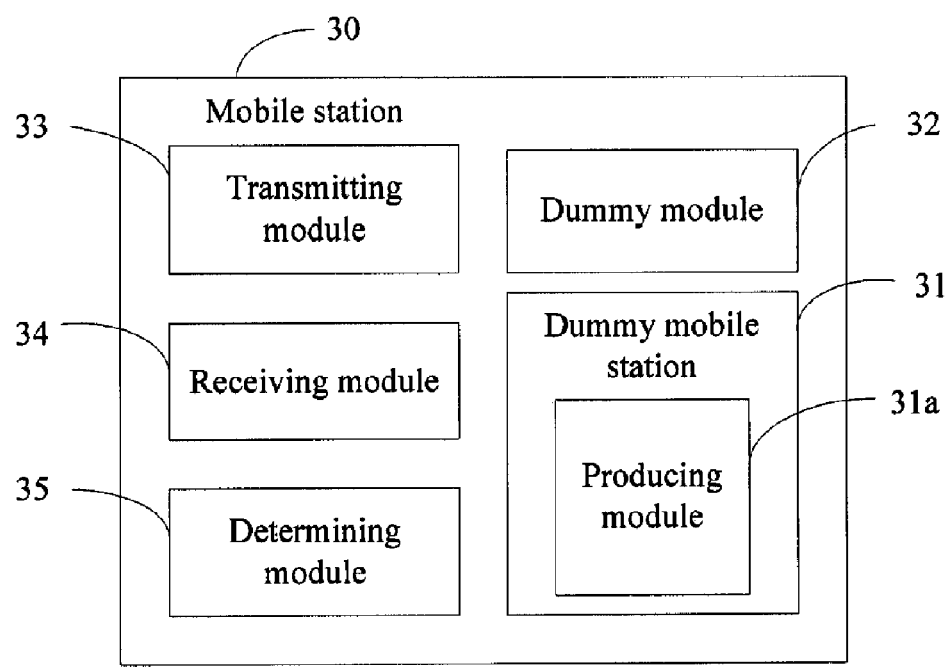
FIG. 2 is a schematic block diagram of functional modules of a mobile station of a second exemplary embodiment of the present invention.

FIG. 2 is a schematic block diagram of functional modules of the mobile station 30 of a second exemplary embodiment of the present invention. In the exemplary embodiment, the mobile station 30 includes a dummy mobile station 31, a dummy module 32, a transmitting module 33, a receiving module 34, and a determining module 35. The dummy module 32 produces the dummy mobile station 31. In the exemplary embodiment, when the mobile station 30 enters a power save mode, the dummy module 32 produces the dummy mobile station 31. The dummy mobile station 31 includes a producing module 31a for producing mock data used for detecting an attack.

The transmitting module 33 transmits the mock data produced by the producing module 31a via the access point 20. In the exemplary embodiment, the access point 20 receives and saves the mock data. If the access point 20 does not suffer an attack from the attacking mobile station 40, the mock data will still be saved in the access point 20, if there is an attack, the mock data will be gone.

The receiving module 34 receives data from the access point 20. In the exemplary embodiment, when the mobile station 30 asks the access point 20 for data, and the access point 20 transmits the data to the mobile station 30, the receiving module 34 receives the data from the access point 20. The determining module 35 determines whether the mock data is saved in the access point 20 to detect whether there is an attack. In the exemplary embodiment, the determining module 35 checks whether the received data is the same as the mock data to determine whether the mock data is saved in the access point 20. If the received data is the same as the mock data, then the mobile station 30 determines there is no attack. If the received data is not the same as the mock data, the mobile station 30 determines there is an attack.

In the exemplary embodiment, if the mobile station 30 transmits a power save request to the access point 20, the access point 20 transmits back a power save response. When the mobile station 30 receives the power save response from the access point 20, the mobile station 30 enters the power save mode. The power save mode includes a power save polling (PSP) mode and an unscheduled automatic power save delivery (U-APSD) mode.

Figure 3:
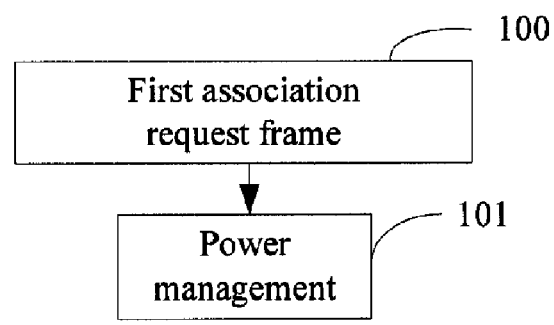
FIG. 3 is a schematic diagram of a first association request frame of the second exemplary embodiment of the present invention.

When the mobile station 30 requests to enter a PSP mode, the mobile station 30 will transmit a first association request frame 100. Referring to FIG. 3, the first association request frame 100 includes a power management field 101. Each frame in the exemplary embodiment conforms to the standard of the institute of electrical and electronics engineers (IEEE) 802.11, and only relevant fields instead of all fields of the frame are disclosed in FIG. 3. The power management field 101 informs the access point 20 that the mobile station 30 requests to enter the power save mode. In the exemplary embodiment, if the power management field 101 of the first association request frame 100 is set to 1, the mobile station 30 will request to enter a PSP mode.

Figure 4:
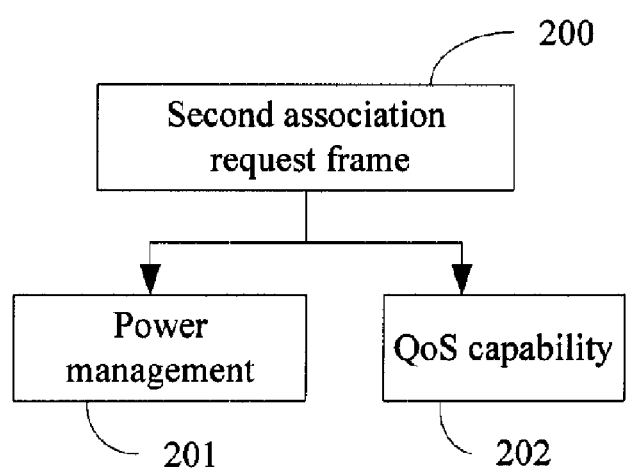
FIG. 4 is a schematic diagram of a second association request frame of the second exemplary embodiment of the present invention.
Figure 5:
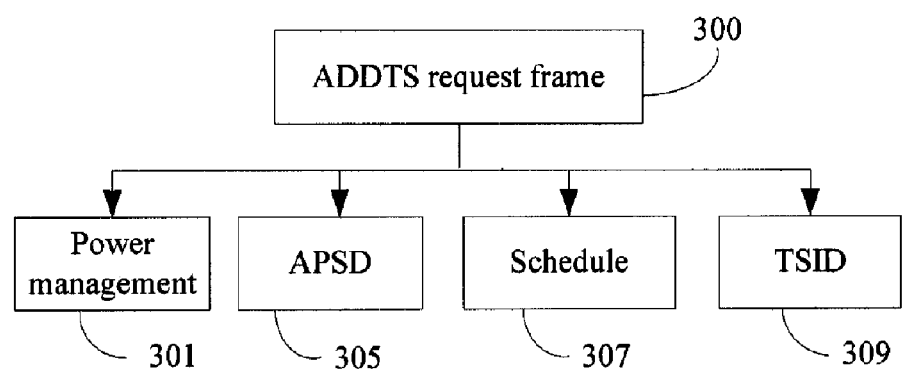
FIG. 5 is a schematic diagram of an add traffic spec (AD-DTS) request frame of the second exemplary embodiment of the present invention.

When the mobile station 30 requests to enter a U-APSD mode, the mobile station 30 will transmit a second association request frame 200 of FIG. 4 or an add traffic spec (ADDTS) request frame 300 of FIG. 5 according to different designs. Referring to FIG. 4, the second association request frame 200 includes a power management field 201 and a quality of service (QoS) capability field 202. The power management field 201 informs the access point 20 that the mobile station 30 requests to enter the power save mode. The QoS capability field 202 further informs the access point 20 which access category (AC) level is requested for entering the U-APSD mode. The AC levels include a best effort (BE) level, a background (BK) level, a video (VI) level, and a voice (VO) level. The QoS capability field 202 indicates one or more of the AC levels is requested for entering the U-APSD mode, and other AC levels which are requested for entering the PSP mode. For example, if the QoS capability field 202 includes the voice level, the voice level is requested for entering the U-APSD mode, and the best effort level, the back ground level, and the voice level are requested for entering the PSP mode.

Referring to FIG. 5, The ADDTS request frame 300 includes a power management field 301, an automatic power save delivery (APSD) field 305, a schedule field 307, and a traffic spec identifier (TSID) field 309. The power management field 301 informs the access point 20 that the mobile station 30 requests to enter the power save mode. The APSD field 305 further informs the access point 20 that the mobile station 30 requests to enter the APSD mode. The schedule field 307 further informs the access point 20 that the mobile station 30 requests to enter the U-APSD mode. In the exemplary embodiment, if the power management field 301 is set to 1, the APSD field 305 is set to 1, and the schedule field 307 is set to 0, then the mobile station 30 enters a U-APSD mode. The AC levels include the best effort level, the background level, the video level, and the voice level. The TSID field 309 can indicate one of the AC levels is requested for entering the U-APSD mode, and other AC levels are requested for entering the PSP mode. That is, if the mobile station 30 requests to enter the U-APSD mode, the TSID field 309 must indicate one AC level.

Figure 6:
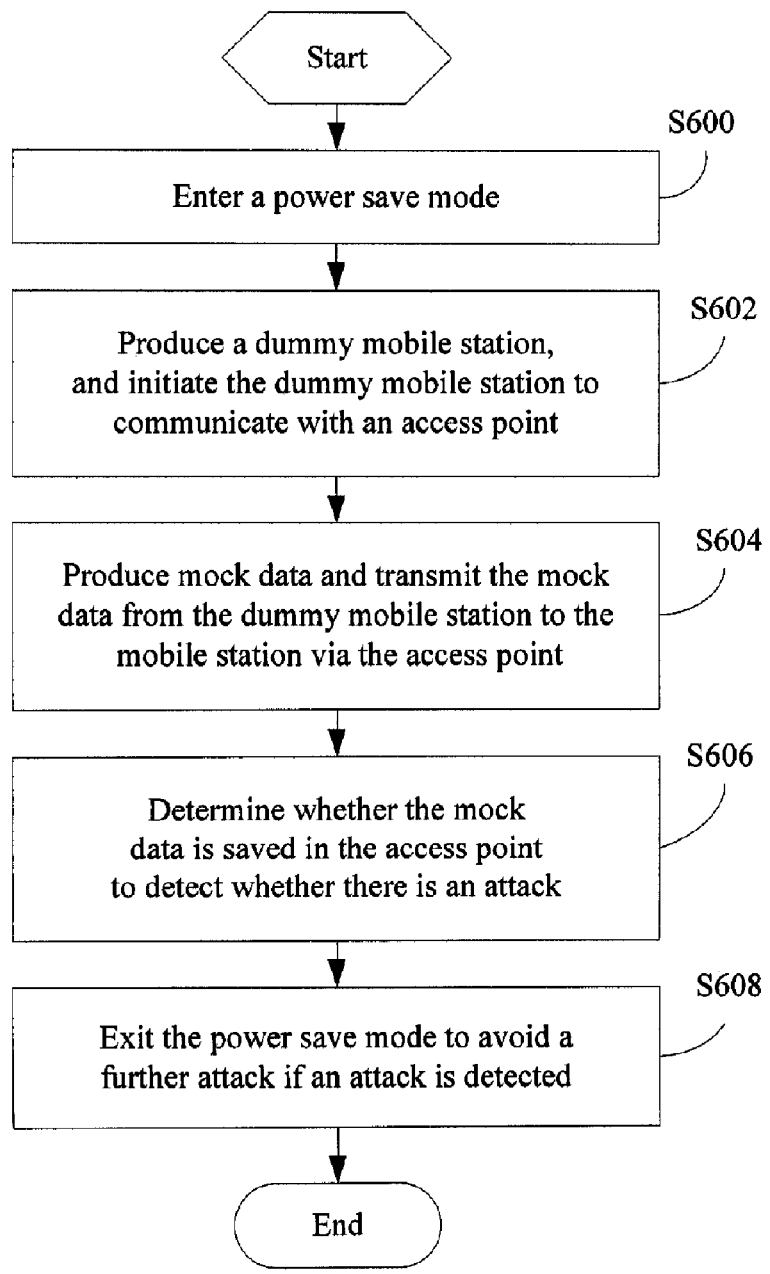
FIG. 6 is a flowchart of a method for detecting attacks in a power save mode of a third exemplary embodiment of the present invention.

FIG. 6 is a flowchart of a method for detecting attacks in a power save mode of a third exemplary embodiment of the present invention.

In step S600, the mobile station 30 enters a power save mode. In step S602, the mobile station 30 produces a dummy mobile station 31, and initiates the dummy mobile station 31 to communicate with the access point 20. In step S604, the dummy mobile station 31 produces mock data and transmits the mock data to the mobile station 30 via the access point 20. In step S606, the mobile station 30 determines whether the mock data is saved in the access point 20 to detect whether there is an attack. In step S608, the mobile station 30 exits the power save mode to avoid a further attack if an attack is detected.

Figure 7:
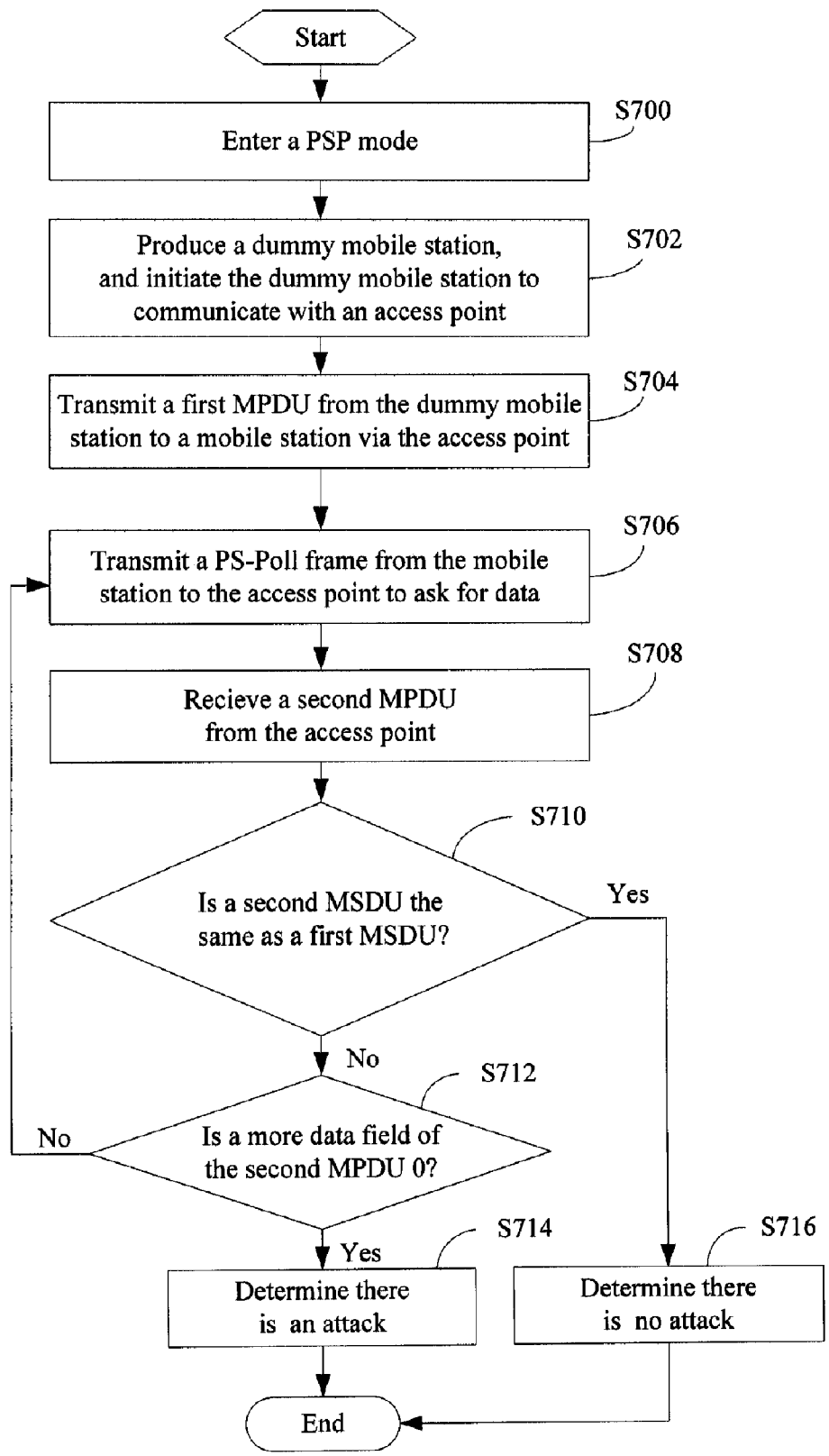
FIG. 7 is a flowchart of a method for detecting attacks in a power save mode of a fourth exemplary embodiment of the present invention.

FIG. 7 is a flowchart of a method for detecting attacks in a power save mode of a fourth exemplary embodiment of the present invention.

In step S700, the mobile station 30 enters a PSP mode. In the exemplary embodiment, the mobile station 30 transmits a first association request frame 100 of FIG. 3 to the access point 20 to request to enter a PSP mode. In the exemplary embodiment, the power management field 101 of the first association request frame 100 is set to 1. Then the mobile station 30 receives a first association response frame from the access point 20, and enters the PSP mode.

In step S702, the mobile station 30 produces the dummy mobile station 31, and initiates the dummy mobile station 31 to communicate with the access point 20. In the exemplary embodiment, the mobile station 30 produces a dummy MAC address to produce the dummy mobile station 31. The mobile station 30 transmits frames to the access point 20 by using the dummy MAC address. The access point 20 receives the frames, and the mobile station 30 with the dummy MAC address is regarded as a new mobile station, namely the dummy mobile station 31.

Figure 8:
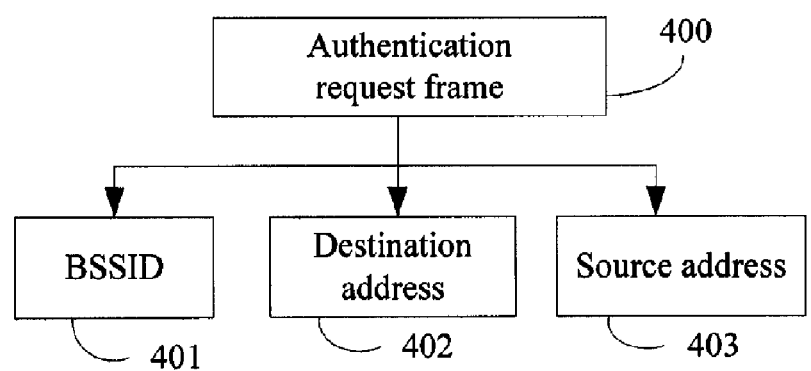
FIG. 8 is a schematic diagram of an authentication request frame of the fourth exemplary embodiment of the present invention.

The dummy mobile station 31 needs to authenticate and associate with the access point 20 to initiate communication with the access point 20. The dummy mobile station 31 first transmits an authentication request frame 400 to the access point 20. Referring to FIG. 8, the authentication request frame 400 includes a basic service set identifier (BSSID) field 401, a destination address (DA) field 402, and a source address (SA) field 403. In the exemplary embodiment, the wireless communication system is a basic service set (BSS) with an infrastructure, so the BSSID field 401 is set to an MAC address of the access point 20. The DA field 402 is set to the MAC address of the access point 20. The SA field 403 is set to the MAC address of the dummy mobile station 31. Then the dummy mobile station 31 receives an authentication response frame from the access point 20.

Figure 9:
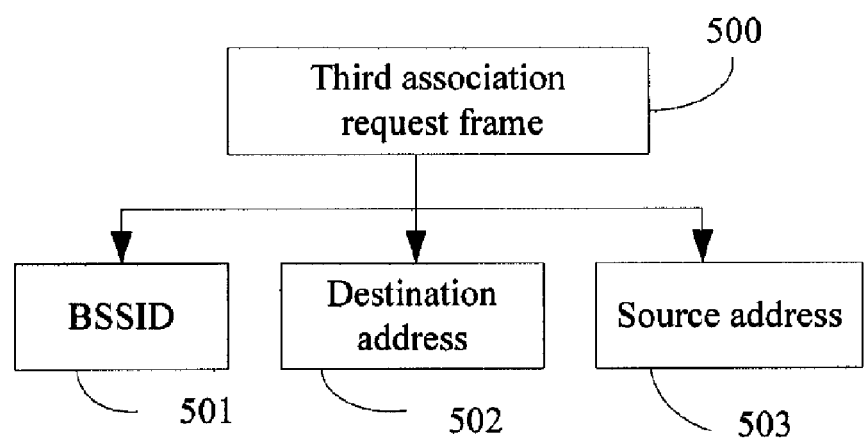
FIG. 9 is a schematic diagram of a third association request frame of the fourth exemplary embodiment of the present invention.

The dummy mobile station 31 further transmits a third association request frame 500 to the access point 20. Referring to FIG. 9, the third association request frame 500 includes a BSSID field 501, a DA field 502, and a SA field 503. The settings of the BSSID field 501, the DA field 502, and the SA field 503 of the third association request frame 500 are the same as the settings of the BSSID field 401, the DA field 402, and the SA field 403 of the authentication request frame 400. Then the dummy mobile station 31 receives a third association response frame from the access point, and successfully communicates with the access point 20.

Referring again to FIG. 7, in step S704, the dummy mobile station 31 transmits a first MAC protocol data unit (MPDU) 600 to the mobile station 30 via the access point 20.

Figure 10:
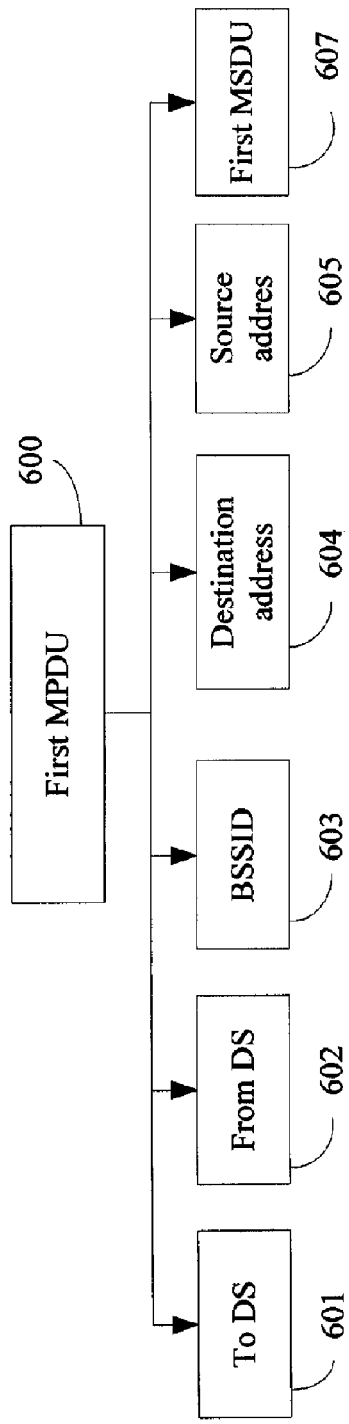
FIG. 10 is a schematic diagram of a first media access control (MAC) protocol data unit (MPDU) of the fourth exemplary embodiment of the present invention.

As shown in FIG. 10, the first MPDU 600 includes a To distributed system (DS) field 601, a From DS field 602, a BSSID field 603, a DA field 604, a SA field 605, and a first MAC service data unit (MSDU) 607. In the exemplary embodiment, the To DS field 601 and the From DS field 602 are respectively set to 1 and 0, indicating that the first MPDU 600 is destined for a distributed system. The BSSID field 603 is set to the MAC address of the access point 20. The DA field 604 is set to the MAC address of the mobile station 30. The SA field 605 is set to the MAC address of the dummy mobile station 31, namely the dummy MAC address produced by the mobile station 30. The first MSDU 607 includes data that the dummy mobile station 31 transmits to the mobile station 30. The mobile station 30 is in the power save mode, so the access point 20 receives the first MPDU 600, and saves the first MSDU 607 of the first MPDU 600 in a buffer of the access point 20.

Referring back to FIG. 7, in step S706, the mobile station 30 transmits a power save polling (PS-Poll) frame 700 to the access point 20 to ask for data.

Figure 11:
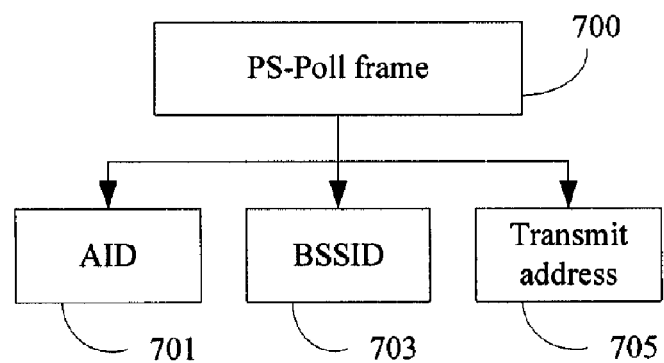
FIG. 11 is a schematic diagram of a power save polling (PS-Poll) frame of the fourth exemplary embodiment of the present invention.

As shown in FIG. 11, the PS-Poll frame 700 includes an association identifier (AID) field 701, a BSSID field 703, and a transmit address (TA) field 705. The AID field 701 includes 16 bits ranging from a first bit to a sixteenth bit. A fifteenth bit and the sixteenth bit of the 16 bits are both set to 1, and the first bit to a fourteenth bit is set to the AID of the mobile station 30. The AID of the mobile station 30 is an identifier of the mobile station 30 distributed by the access point 20, in order to distinguish the mobile station 30 from other mobile stations. The BSSID field 703 is set to the MAC address of the access point 20. The TA field 705 is set to the MAC address of the mobile station 30.

Referring again to FIG. 7, in step S708, the mobile station 30 receives a second MPDU 800 from the access point 20.

Figure 12:
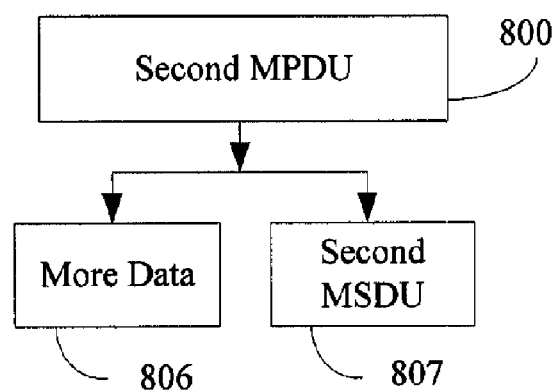
FIG. 12 is a schematic diagram of a second MPDU of the fourth exemplary embodiment of the present invention.

As shown in FIG. 12, the second MPDU 800 includes a more data field 806 and a second MSDU 807. The more data field 806 informs the mobile station 30 whether the access point 20 still includes at least one MSDU required to be sent to the mobile station 30. If the more data field 806 is set to 1, the access point 20 includes at least one MSDU required to be sent to the mobile station 30. The second MSDU 807 includes data sent by other mobile stations including the dummy mobile station 31 in the wireless local network to the mobile station 30 via the access point 20.

As shown in FIG. 7, in step S710, the mobile station 30 determines whether the second MSDU 807 is the same as the first MSDU 607.

If the second MSDU 807 is the same as the first MSDU 607, in step S716, the mobile station 30 determines there is no attack.

If the second MSDU 807 is not the same as the first MSDU 607, in step S712, the mobile station 30 determines whether the more data field 806 of the second MPDU 800 is 0.

If the more data field 806 is 0, in step S714, the mobile station 30 determines there is an attack.

If the more data field 806 is not 0, going back to step S706, the mobile station 30 further transmits the PS-Poll frame 700 to the access point 20 to ask for data. The above steps are repeated until the more data field 806 of the second MPDU 800 is 0. That is, the access point 20 includes no MSDU required to be sent to the mobile station 30.

Figure 13:
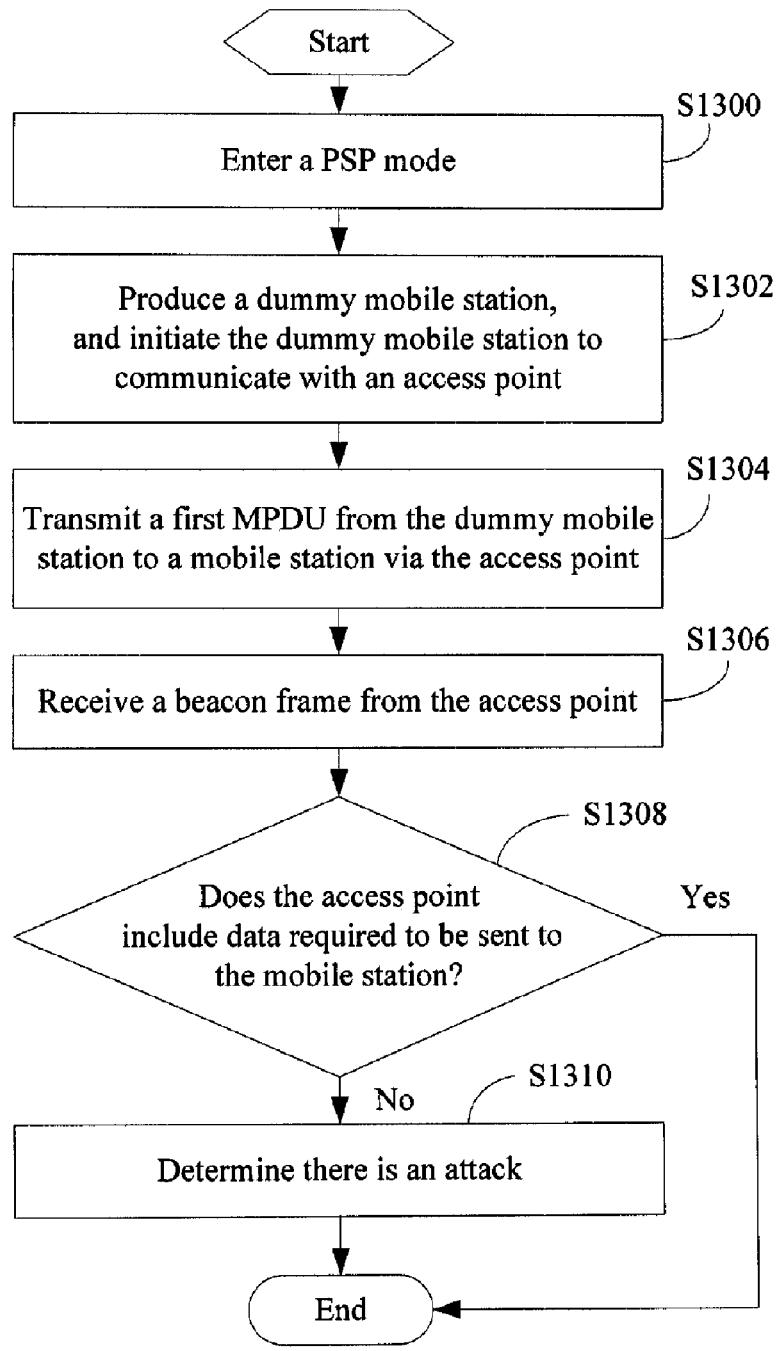
FIG. 13 is a flowchart of a method for detecting attacks in a power save mode of a fifth exemplary embodiment of the present invention.

FIG. 13 is a flowchart of a method for detecting attacks in a power save mode of a fifth exemplary embodiment of the present invention.

Figure 14:
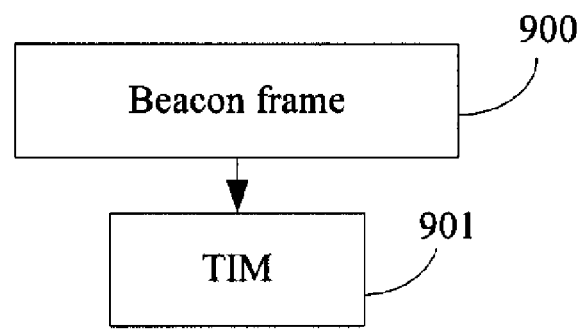
FIG. 14 is a schematic diagram of a beacon frame of the fifth exemplary embodiment of the present invention.

In the exemplary embodiment, the access point 20 broadcasts a beacon frame 900 at each beacon interval. Referring to FIG. 14, the beacon frame 900 includes a traffic-indication map (TIM) field 901. The TIM field 901 includes a mapping table including an AID of each mobile station communicating with the access point 20. For each AID, 1 bit indicates whether the buffer of the access point 20 includes data required to be sent to the mobile station with the AID. Therefore, when the mobile station 30 knows that the buffer of the access point 20 does not include data required to be sent to the mobile station 30 according to the TIM field 901 of the beacon frame 900, the mobile station 30 determines there is an attack. However, if the buffer of the access point 20 includes data required to be sent to the mobile station 30, the mobile station 30 needs to follow steps S706, S708, S710, and S712 of FIG. 7 to further detect an attack.

The steps S1300, S1302, and S1304 of this embodiment are the same as the steps S700, S702, and S704 of FIG. 7, respectively, so the descriptions are omitted.

In step S1306, the mobile station 30 receives the beacon frame 900 as shown in FIG. 14 broadcast by the access point 20. In step S1308, the mobile station 30 determines whether the access point 20 includes data required to be sent to the mobile station 30, according to the TIM field 901 of the beacon frame 900.

If the access point 20 does not include data required to be sent to the mobile station 30, in step S1310, the mobile station 30 determines there is an attack.

If the access point 20 includes data to be sent to the mobile station 30, the mobile station 30 cannot determine whether an attack exists. The mobile station 30 needs to follow steps S706, S708, S710, and S712 of FIG. 7 to detect an attack.

Figure 15:
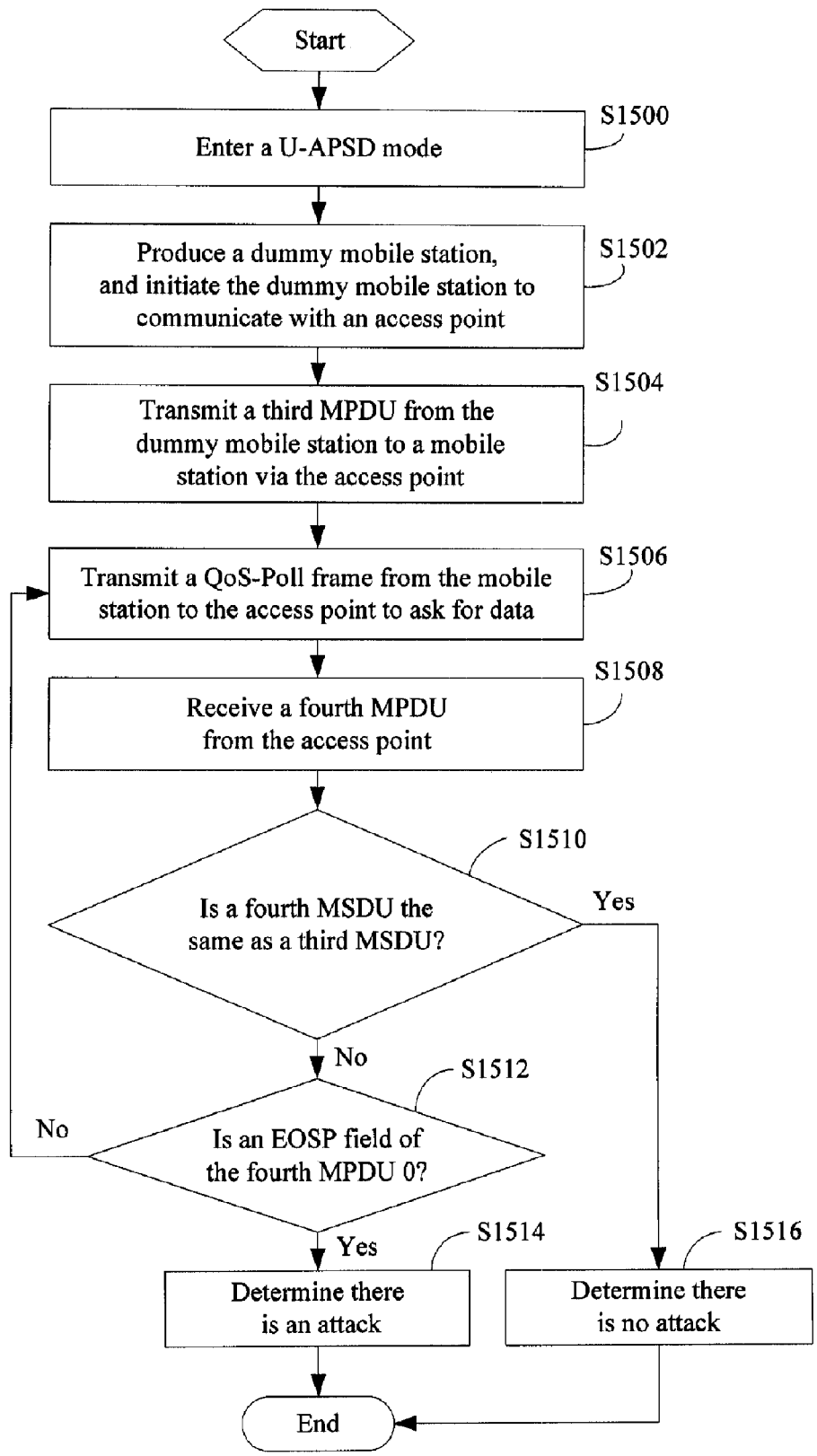
FIG. 15 is a flowchart of a method for detecting attacks in a power save mode of a sixth exemplary embodiment of the present invention.

FIG. 15 is a flowchart of a method for detecting attacks in a power save mode of a sixth exemplary embodiment of the present invention.

In step S1500, the mobile station 30 enters the U-APSD mode. In the exemplary embodiment, the mobile station 30 transmits the second association request frame 200 to the access point 20 to request to enter the U-APSD mode. Referring back to FIG. 4, the power management field 201 is set to 1, the QoS capability field 202 is set to a voice level, so the mobile station 30 requests the voice level to enter the U-APSD mode, and requests other AC levels to enter the PSP mode. Then the mobile station 30 receives a second association response frame from the access point 20, and enters the U-APSD mode.

In another exemplary embodiment, the mobile station 300 transmits an ADDTS request frame 300 to the access point 30 to request to enter the U-APSD mode.

The step S1502 of this embodiment is the same as the step S702 of FIG. 7, so the description of the step S1502 is omitted.

Figure 16:
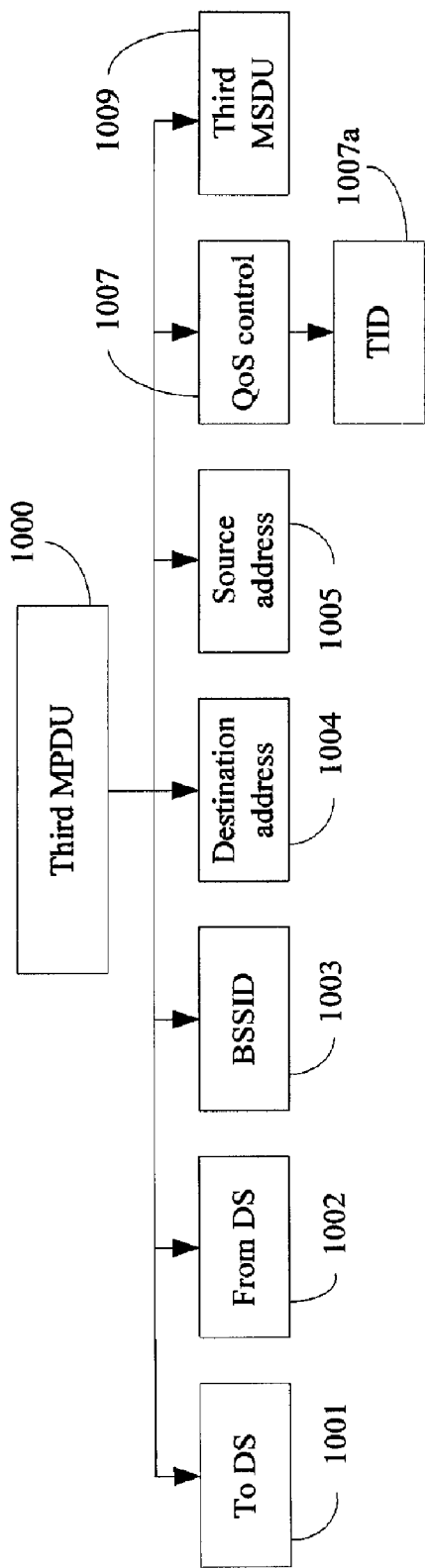
FIG. 16 is a schematic diagram of a third MPDU of the sixth exemplary embodiment of the present invention.

In step S1504, the dummy mobile station 31 transmits a third MPDU 1000 to the mobile station 30 via the access point 20. As shown in FIG. 16, the third MPDU 1000 includes a To DS field 1001, a From DS field 1002, a BSSID field 1003, a DA field 1004, a SA field 1005, a QoS control field 1007 and a third MSDU 1009. In the exemplary embodiment, the To DS field 1001 and the From DS field 1002 are respectively set to 1 and 0. The BSSID field 1003 is set to the MAC address of the access point 20. The DA field 1004 is set to the MAC address of the mobile station 30. The SA field 1005 is set to the MAC address of the dummy mobile station 31. The QoS control field 1007 includes a traffic identifier (TID) field 1007a for indicating the AC level.

In the exemplary embodiment, the AC level indicated by the TID field 1007 is the same as the AC level indicated by the QoS capability field 202 of the second association frame 200.

The third MSDU 1009 includes data that the dummy mobile station 31 transmits to the mobile station 20. The mobile station 30 is in a power save mode, so the access point 20 receives the third MPDU 1000, and saves the third MSDU 1009 in the buffer of the access point 20.

Figure 17:
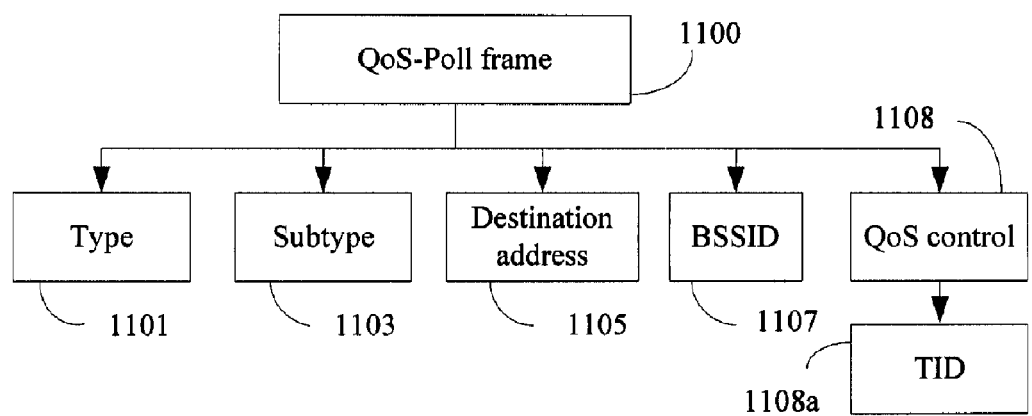
FIG. 17 is a schematic diagram of a quality of service polling (QoS-Poll) frame of the sixth exemplary embodiment of the present invention.

In step S1506, the mobile station 30 transmits a Quality of Service Polling (QoS-Poll) frame 1100 to the access point 20 to ask for data. Referring to FIG. 17, the QoS-Poll frame 1100 includes a type field 1101, a subtype field 1103, a DA field 1105, a BSSID field 1107, and a QoS control field 1108. The type field 1101 and the subtype field 1103 indicate the type of the QoS-Poll frame 1100. In the exemplary embodiment, the QoS-Poll frame 1100 includes two kinds of frames, such as a QoS data frame and a QoS null frame. When the type field 1101 is set to 10, and the subtype field 1103 is set to 1000, then the QoS-Poll frame 1100 is a QoS data frame. When the type field 1101 is set to 10, and the subtype field 1103 is set to 1100, then the QoS-Poll frame 1100 is a QoS null frame. The DA field 1105 is set to the MAC address of the access point 20. The BSSID field 1107 is set to the MAC address of the access point 20. The QoS control field 1108 includes a TID field 1108a for indicating an AC level. In the exemplary embodiment, the AC level indicated by the TID field 1108a is the same as the AC level indicated by the QoS capability field 202 of the second association frame 200.

Figure 18:
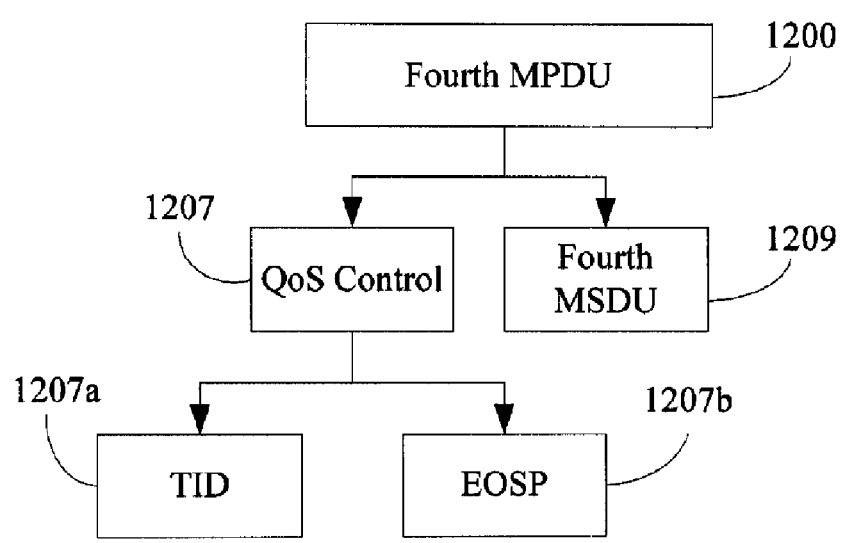
FIG. 18 is a schematic diagram of a fourth MPDU of the sixth exemplary embodiment of the present invention.

In step S1508, the mobile station 30 receives a fourth MPDU 1200 from the access point 20. Referring to FIG. 18, the fourth MPDU 1200 includes a QoS control field 1207 and a fourth MSDU 1209. The QoS control field 1207 includes a TID field 1207a and an end of service period (EOSP) field 1207b. The TID field 1207a indicates the AC level. The EOSP field 1207b informs the mobile station 30 whether the access point 20 includes at least one MSDU required to be sent to the mobile station 30. The fourth MSDU 1209 includes data sent by other mobile stations including the dummy mobile station 31 in the wireless local network to the mobile station 30 via the access point 20.

In step S1510, the mobile station 30 determines whether the fourth MSDU 1209 is the same as the third MSDU 1009.

If the fourth MSDU 1209 is the same as the third MSDU 1009, in step S1516, the mobile station 30 determines there is no attack.

If the fourth MSDU 1209 is not the same as the third MSDU 1009, in step S1512, the mobile station 30 determines whether the EOSP field 1207b of the fourth MPDU 1200 is 0.

If the EOSP field 1207b of the fourth MPDU 1200 is 0, in step S1514, the mobile station 30 determines there is an attack.

If the EOSP field 1207b of the fourth MPDU 1200 is not 0, in step S1506, the mobile station 30 further transmits the QoS-Poll frame 1100 to the access point 20 to ask for data. The above steps are repeated until the EOSP field 1207b of the fourth MPDU 1200 is 0. That is, the access point 20 does not include MSDU required to be sent to the mobile station 30.

By employing the method for detecting attacks in a power save mode of the present invention, the mobile station 30 can detect the sniffer attack and avoid losing data. When detecting an attack, the mobile station 30 exits the power save mode to avoid a further attack and data loss.

While various embodiments and methods of the present invention have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. A mobile station for detecting attacks in a power save mode, comprising:
   a dummy module for producing a dummy mobile station, wherein the dummy mobile station comprises a producing module for producing mock data;
   a receiving module for receiving data from an access point; and
   a determining module for checking whether the received data is the same as the mock data to determine whether the mock data is saved in an access point so as to detect whether there is an attack.

2. The mobile station as claimed in claim 1, further comprising a transmitting module for transmitting the mock data via the access point.

3. A method for detecting attacks in a power save mode, comprising:
   providing a mobile station and an access point;
   entering a power save mode by the mobile station;
   producing a dummy mobile station by the mobile station, and initiating the dummy mobile station to communicate with the access point;

producing mock data and transmitting the mock data from the dummy mobile station to the mobile station via the access point; and determining whether the mock data is saved in the access point to detect whether there is an attack.

4. The method as claimed in claim 3, further comprising:
exiting the power save mode to avoid a further attack if an attack is detected.

5. The method as claimed in claim 3, wherein the step of producing a dummy mobile station by the mobile station, and initiating the dummy mobile station to communicate with the access point comprises:

producing a dummy media access control (MAC) address to produce the dummy mobile station by the mobile station;

transmitting an authentication request frame from the dummy mobile station to the access point;

receiving an authentication response frame from the access point;

transmitting an association request frame from the dummy mobile station to the access point; and receiving an association request frame from the access point.

6. The method as claimed in claim 3, wherein the power save mode comprises a power save polling (PSP) mode.

7. The method as claimed in claim 6, wherein the entering step comprises:

transmitting an association request frame from the mobile station to the access point to request to enter the PSP mode.

8. The method as claimed in claim 7, wherein the step of producing mock data and transmitting the mock data from the dummy mobile station to the mobile station via the access point comprises:

transmitting a first media access control protocol data unit (MPDU) from the dummy mobile station to the mobile station via the access point, wherein the first MPDU comprises a first media access control service data unit (MSDU); and saving the first MSDU in the access point.

9. The method as claimed in claim 8, wherein the determining step comprises:

transmitting a power save polling (PS-Poll) frame from the mobile station to the access point to ask for data;

receiving a second MPDU from the access point, wherein the second MPDU comprises a second MSDU and a more data field;

determining whether the second MSDU is the same as the first MSDU; and determining there is no attack, if the second MSDU is the same as the first MSDU.

10. The method as claimed in claim 9, wherein the determining step further comprises:

determining whether the more data field is zero, if the second MSDU is not the same as the first MSDU; and determining there is an attack, if the more data field is zero.

11. The method as claimed in claim 8, wherein the determining step comprises:

receiving a beacon frame from the access point;

determining whether the access point comprises data required to be sent to the mobile station according to the beacon frame; and determining there is an attack, if the access point does not comprise data required to be sent to the mobile station.

12. The method as claimed in claim 3, wherein the power save mode comprises an unscheduled automatic power save delivery (U-APSD) mode.

13. The method as claimed in claim 12, wherein the entering step comprises:

transmitting an association request frame from the mobile station to the access point to request to enter the U-APSD mode.

14. The method as claimed in claim 12, wherein the entering step comprises:

transmitting an add traffic spec (ADDTS) request frame from the mobile station to the access point to request to enter the U-APSD mode.

15. The method as claimed in claim 12, wherein the step of producing mock data and transmitting the mock data from the dummy mobile station to the mobile station via the access point comprises:

transmitting a third media access control (MAC) protocol data unit (MPDU) from the dummy access point to the mobile station via the access point, wherein the third MPDU comprises a third MAC service data unit (MSDU); and saving the third MSDU in the access point.

16. The method as claimed in claim 15, wherein the determining step comprises:

transmitting a quality of service polling (QoS-Poll) frame from the mobile station to the access point to ask for data;

receiving a fourth MPDU from the access point, wherein the fourth MPDU comprises a fourth MSDU and an end of service period (EOSP) field;

determining whether the fourth MSDU is the same as the third MSDU; and determining there is no attack, if the fourth MSDU is the same as the third MSDU.

17. The method as claimed in claim 16, wherein the determining step further comprises:

determining whether the EOSP field is zero, if the fourth MSDU is not the same as the third MSDU; and determining there is an attack, if the EOSP field is zero.

18. A method for detecting attacks during a power save mode of a mobile station, comprising:

establishing data-communication between an access point and a mobile station able to enter a power save mode thereof based on inactive use of said mobile station;

initiating a dummy station defined in said mobile station to be data-communicable with said access point when said mobile station enters said power save mode;

transmitting mock data generated by said dummy station to said mobile station via said access point; and verifying said transmitted mock data based on originally generated mock data by said dummy station to decide whether there is an attack toward said mobile station and said access point.

* * * * *